(12) United States Patent
Klein et al.

(10) Patent No.: US 11,150,381 B2
(45) Date of Patent: *Oct. 19, 2021

(54) COLLECTION VESSEL FOR COLLECTING, MEASURING, AND AGGREGRATING PRECIPITATION ACCUMULATION DATA

(71) Applicant: International Business Machines Corporation, Armonk, NY (US)

(72) Inventors: Levente Klein, Tuckahoe, NY (US); Siyuan Lu, Yorktown Heights, NY (US); Fernando J. Marianno, New York, NY (US); Theodore G. van Kessel, Millbrook, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 111 days.

This patent is subject to a terminal disclaimer.

(21) Appl. No.: 16/674,253

(22) Filed: Nov. 5, 2019

(65) Prior Publication Data

US 2020/0073015 A1 Mar. 5, 2020

Related U.S. Application Data

(60) Continuation of application No. 16/420,312, filed on May 23, 2019, which is a division of application No. (Continued)

(51) Int. Cl.
*G01W 1/10* (2006.01)
*G01W 1/14* (2006.01)

(52) U.S. Cl.
CPC ............ *G01W 1/14* (2013.01); *G01W 1/10* (2013.01)

(58) Field of Classification Search
CPC ............ G01W 1/14; G01W 1/00; G01W 1/02; G01W 1/10; G01W 1/04; G01W 1/06;
(Continued)

(56) References Cited

U.S. PATENT DOCUMENTS 2,701,472 A 2/1955 Allen et al.
3,958,457 A 5/1976 Mink
(Continued)

FOREIGN PATENT DOCUMENTS

GB 2533396 A 6/2016

OTHER PUBLICATIONS

List of IBM Patents or Patent Applictions Treated as Related; (Appendix P), Date Filed Nov. 5, 2019, 2 pages.
(Continued)

*Primary Examiner* — Andre J Allen
(74) *Attorney, Agent, or Firm* — Cantor Colburn LLP; Randall Bluestone

(57) ABSTRACT

Embodiments for controlling precipitation collection vessels to accurately and efficiently collect, measure, and aggregate precipitation accumulation data are disclosed. In one embodiment according to aspects of the present invention, a computer-implemented method includes collecting snow in a plurality of collection vessels by orienting an open end of each of the plurality of collection vessels perpendicularly to a direction of the wind based at least in part on a wind model. The computer-implemented method further includes measuring a snow level of the snow in each of the plurality of collection vessels to generate snow level data for each of the plurality of collection vessels. The computer-implemented method further includes aggregating the snow level data for each of the plurality of snow collection by assembling the snow accumulation data from each of the plurality of collection vessels.

20 Claims, 11 Drawing Sheets

Related U.S. Application Data

15/463,412, filed on Mar. 20, 2017, now Pat. No. 10,408,973.

(58) Field of Classification Search
CPC ... G01W 1/08; G01W 1/16; G01W 2001/003; G01W 2001/006; G01W 2203/00
USPC .......................................... 73/170.16–170.26
See application file for complete search history.

(56) References Cited

U.S. PATENT DOCUMENTS

| | | | |
|---|---|---|---|
| 4,245,499 | A | 1/1981 | Nguyen et al. |
| 4,600,842 | A | 7/1986 | Boschung et al. |
| 4,895,022 | A | 1/1990 | Noren |
| 5,557,040 | A | 9/1996 | Inenaga et al. |
| 5,571,963 | A | 11/1996 | Balchin et al. |
| 5,761,095 | A * | 6/1998 | Warren ................. E01C 19/004 702/166 |
| 5,850,619 | A * | 12/1998 | Rasmussen ............. G01W 1/14 702/3 |
| 6,044,699 | A * | 4/2000 | Greenblatt ............. G01F 23/20 73/170.17 |
| 8,289,394 | B2 | 10/2012 | Kim |
| 8,594,936 | B1 * | 11/2013 | Koval .................... G01W 1/10 702/3 |
| 8,624,730 | B2 | 1/2014 | Chasko |
| 8,725,462 | B2 | 5/2014 | Jain et al. |
| 8,979,363 | B2 | 3/2015 | Groenewe et al. |
| 10,208,462 | B2 | 2/2019 | Carter et al. |
| 10,408,973 | B2 | 9/2019 | Klein et al. |
| 2005/0125083 | A1 | 6/2005 | Kiko |
| 2006/0209090 | A1 | 9/2006 | Kelly et al. |
| 2007/0132599 | A1 | 6/2007 | DuFaux et al. |
| 2008/0184788 | A1 | 8/2008 | Jeong et al. |
| 2011/0219868 | A1 * | 9/2011 | Lane ................... G01F 23/2921 73/170.21 |
| 2014/0188543 | A1 | 7/2014 | Pearlmutter et al. |
| 2015/0154847 | A1 | 6/2015 | Oliver et al. |
| 2016/0223511 | A1 | 8/2016 | Koshnick et al. |
| 2016/0266594 | A1 | 9/2016 | Kauffman et al. |
| 2018/0117400 | A1 | 5/2018 | Martin et al. |
| 2018/0229080 | A1 | 8/2018 | Martin et al. |
| 2018/0246014 | A1 | 8/2018 | Lee et al. |
| 2019/0079214 | A1 * | 3/2019 | Mashhoori ............. G01W 1/10 |
| 2019/0154875 | A1 | 5/2019 | Midya |
| 2019/0278003 | A1 | 5/2019 | Klein et al. |

OTHER PUBLICATIONS

Klein et al., "Collection Vessel for Collecting, Measuring, and Aggregrating Precipitation Accumulation Data", U.S. Appl. No. 16/674,258, filed Nov. 5, 2019.

IBM, et al., "Weather Prediction based on Images taken in the digital camera" Ip.com, Apr. 20, 2009, p. 1-3.

F. Comiti, et al.,"A new monitoring station for debris flows in the European Alps: first observations in the Gadria basin" Nat Hazards, Springer Science+Business Media Dordrecht, Feb. 22, 2014, p. 1-24.

Allamano, et al.,"Toward the camera rain gauge" AGU Publications, Water Resources Research, Mar. 26, 2015, p. 1-14.

O'Conner, et al.,"Remote Weather Reporting System" Ip.com, Feb. 1, 1980, p. 1-2.

T.A. Scambos, et al.,"A camera and multisensor automated station design for polar physical and biological systems monitoring: AMIGOS" Journal of Glaciology, vol. 59, No. 214, 2013, p. 1-12.

* cited by examiner

COLLECTION VESSEL FOR COLLECTING, MEASURING, AND AGGREGRATING PRECIPITATION ACCUMULATION DATA

CROSS-REFERENCE TO RELATED APPLICATIONS

This application is a continuation of U.S. patent application Ser. No. 16/420,312 titled "COLLECTION VESSEL FOR COLLECTING, MEASURING, AND AGGREGRATING PRECIPITATION ACCUMULATION DATA," filed May 23, 2019, which is a divisional of U.S. patent application Ser. No. 15/463,412, titled "COLLECTION VESSEL FOR COLLECTING, MEASURING, AND AGGREGRATING PRECIPITATION ACCUMULATION DATA," filed Mar. 20, 2017, and issued as U.S. Pat. No. 10,408,973 on Sep. 10, 2019, the disclosures of which are incorporated by reference herein in its entirety.

BACKGROUND

The present invention relates in general to measuring precipitation. More specifically, the present invention relates to systems, methods, and computer program products for controlling precipitation collection vessels to accurately and efficiently collect, measure, and aggregate precipitation accumulation data.

Precipitation, such as snow, rain, sleet, hail, etc., is a product of condensation of water vapor in the atmosphere that falls due to gravity. In particular, snow is a form of precipitation that develops in clouds as snow crystals. When snow falls, it accumulates on the ground, on trees, on buildings, on roads, and the like. Accordingly, it is useful to measure snowfall and snow depth. For example, snowfall and snow depth data (referred to herein as "snow accumulation data") can be used to monitor traffic and road conditions, warn citizens of potentially hazardous conditions, predict future snow accumulation, etc. However, accurately and consistently measuring snowfall and snow depth is challenging.

SUMMARY

According to embodiments of the present invention, techniques including methods, systems, and/or computer program products for collecting snow, measuring snow accumulation, and aggregating snow accumulation data are provided. In an embodiment, a computer-implemented method for collecting snow includes orienting, by a processing device, a collection vessel of the precipitation collection system with respect to an x-y plane by adjusting a first motor based at least in part on a wind model. The computer-implemented method further includes orienting, by the processing device, the collection vessel with respect to a z-axis by adjusting a second motor based at least in part on the wind model such that an open end of the collection vessel is aligned perpendicular to a direction of the wind.

In an embodiment, a computer-implemented method for measuring snow includes measuring a frozen precipitation level of the frozen precipitation in a collection vessel. The computer-implemented method further includes heating the collection vessel to convert the frozen precipitation into melted precipitation. The computer-implemented method further includes measuring a melted precipitation level to determine an equivalent water accumulation of the frozen precipitation.

In an embodiment, a computer-implemented method for aggregating snow accumulation data includes receiving, by a processing device, the snow accumulation data from each of a plurality of collection vessels. The computer-implemented method further includes aggregating, by the processing device, the snow accumulation data by assembling the snow accumulation data from each of the plurality of collection vessels to interpolate the snow accumulation data for a geographic area in proximity to the plurality of collection vessels.

In an embodiment, a computer-implemented method includes collecting snow in a plurality of collection vessels by orienting an open end of each of the plurality of collection vessels perpendicularly to a direction of the wind based at least in part on a wind model. The computer-implemented method further includes measuring a snow level of the snow in each of the plurality of collection vessels to generate snow level data for each of the plurality of collection vessels. The computer-implemented method further includes aggregating the snow level data for each of the plurality of snow collection by assembling the snow accumulation data from each of the plurality of collection vessels.

Additional features and aspects of the invention are described in detail herein and are considered a part of the invention. For a better understanding of the present invention, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

Collecting and measuring data about precipitation accumulation can be useful in a variety of ways. For example, snow accumulation data can be used to prioritize snow removal from streets for snow cleaning crews; to provide businesses, schools, hospitals, etc., with real-time assessments of snow accumulations; to warn transportation agencies about water accumulations (e.g., after the snow melts); to warn agencies responsible with storm water management about water accumulations; and the like. However, accurately and consistently measuring snowfall and snow depth is challenging. For example, current collection vessels can inaccurately measure snow accumulation because wind can blow the snow. Consequently, snow can accumulate on the outside of the collection vessels or miss the collection vessels entirely. Moreover, current snow accumulation measurement is largely a manual process currently. In many cities and towns, snow accumulation is only measured in a few locations, and the data is used to interpolate snow accumulation for other locations.

Embodiments of the present invention address these problems by providing systems, methods, and computer program products for precipitation collection systems that accurately collect and measure precipitation. For example, embodiments of the present invention enable orienting a collection vessel of a precipitation collection system to align an open end of the collection vessel perpendicularly to a direction of the wind. In particular, orienting the collection vessel can include adjusting a first motor to orient the collection vessel with respect to an x-y plane and then adjusting a second motor to orient the collection vessel with respect to a z-axis. Embodiments of the present invention also provide for aggregating the precipitation data with predictions from weather agencies, private weather sources, etc. in order to provide more accurate precipitation information to various authorities (i.e., municipal agencies).

Figure 1:
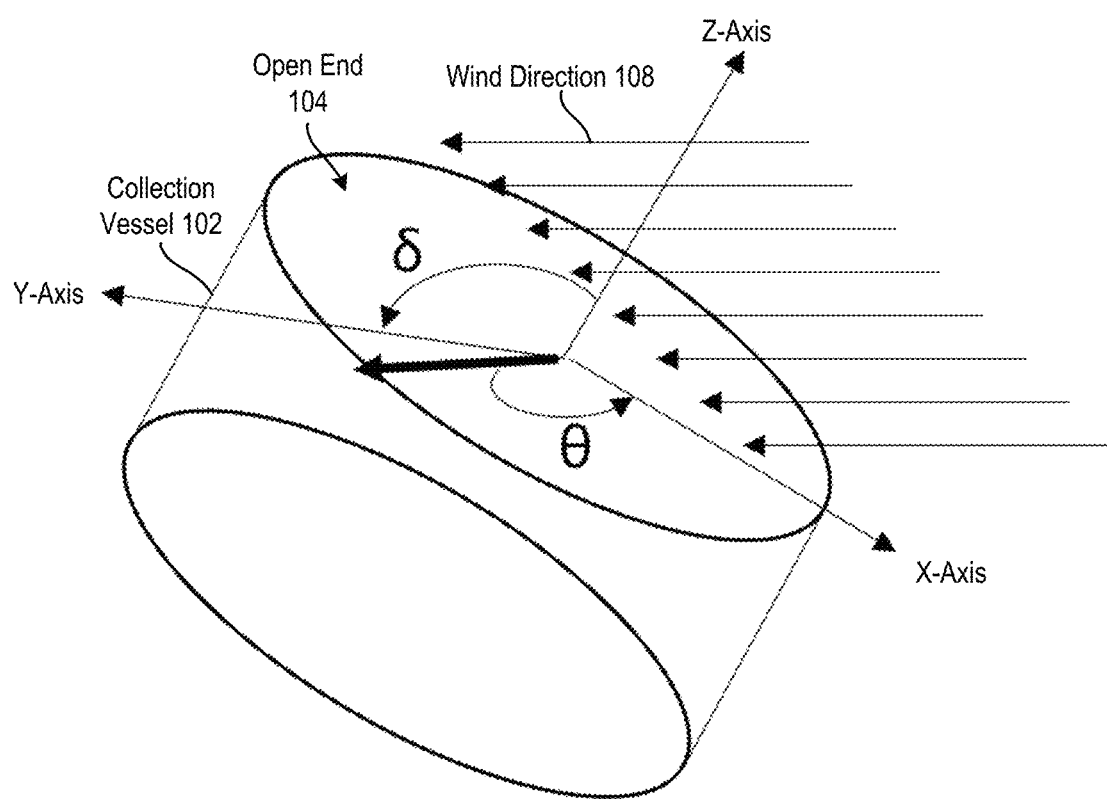
FIG. 1 depicts a block diagram of a precipitation collection vessel for collecting precipitation according to embodiments of the present invention.

FIG. 1 depicts a block diagram of a precipitation collection vessel 102 for collecting precipitation according to embodiments of the present invention. FIG. 1 also depicts a wind direction 108. The collection vessel 102 can be any suitable shape for collecting snow (not shown). Although the embodiments of the invention described herein refer to the collection and measurement of snow, other precipitation (e.g., rain, hail, sleet, etc.) can also be collected and measured according to the described embodiments. As illustrated in FIG. 1, the collection vessel 102 can be a cylinder having an open end 104. Falling snow enters the collection vessel 102 through the open end 104 and accumulates in the collection vessel 102.

The wind direction 108 can affect the amount of snow accumulation. For example, if the open end 104 is at an angle other than perpendicular to the wind direction 108, then the snow may or may not accumulate evenly in the collection vessel 102. Snow can accumulate in excess of the actual snowfall amount on the windward side of the collection vessel 102 while accumulating less than the actual snowfall amount on the leeward side of the collection vessel 102. Accordingly, the snow collected in the collection vessel 102 may not be an accurate representation of snowfall.

Embodiments of the present invention address this problem by orienting the open end 104 of the collection vessel 102 into the wind direction 108. In particular, the open end 104 of the collection vessel 102 is oriented perpendicular to the wind direction 108 according to embodiments of the present invention. As illustrated in FIG. 1, orienting the collection vessel 102 includes changing the angle Θ (e.g., the angle between the wind direction 108 and the x-y plane formed by the x-axis and the y-axis) and the angle δ (e.g., the angle between the wind direction 108 and the z-axis) such that the angles Θ and δ are approximately 90° (i.e., perpendicular). The change in angle is such that the vessel is tilted until it intersects a constant surface for the wind blowing direction that requires an adjustment in tilt once the wind direction changes.

Figure 2:
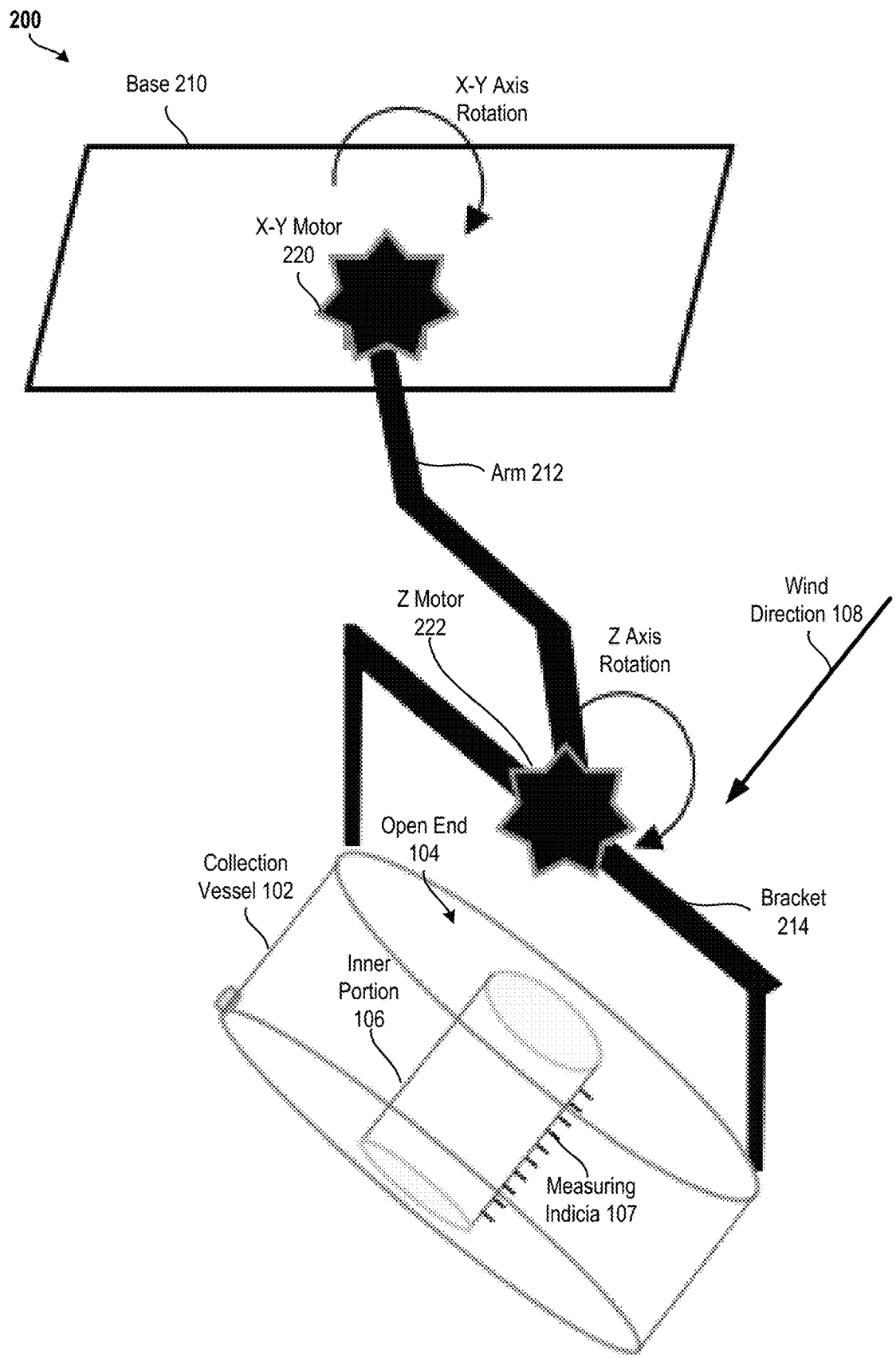
FIG. 2 depicts a block diagram of a precipitation collection device for collecting precipitation using the collection vessel of FIG. 1 according to embodiments of the present invention.

FIG. 2 depicts a block diagram of a precipitation collection device 200 for collecting precipitation using the collection vessel 102 of FIG. 1 according to embodiments of the present invention. The snow collection device 200 includes a base 200 having an x-y motor 220 to rotate an arm 212 about the x-y axis. The snow collection device 200 also includes a z motor 222 to rotate a bracket 214 about the arm 212. The collection vessel 102 is coupled to the bracket 214. Accordingly, the embodiment of FIG. 2 provides 3-axis movement of the collection vessel 102.

As illustrated in FIG. 2, according to embodiments of the present invention, the collection vessel 102 includes an inner portion 106 formed around a center axis of the collection vessel 102. The inner portion (or "core") 106 can include measuring indicia 107 that enable a collected volume of snow to be measured. The measuring indicia 107 can include marks along the surface of the inner portion 106 that are spaced at suitable intervals for measure snow (e.g., every 0.1 inch, every 0.25 inch, every 0.5 inch, every inch, etc., and combinations thereof). The collected volume of snow can be measured by comparing the measured volume of snow to the measuring indicia 107. In this way, the measuring indicia 107 provide a gauge for measuring.

The x-y motor 220 and the z motor 222 can be any suitable type of motor that converts energy into mechanical energy (e.g., an electric motor, a pneumatic motor, a combustion engine, etc.). The x-y motor 220 and the z motor 222 can be the same type of motors or can be different types of motors.

Figure 3:
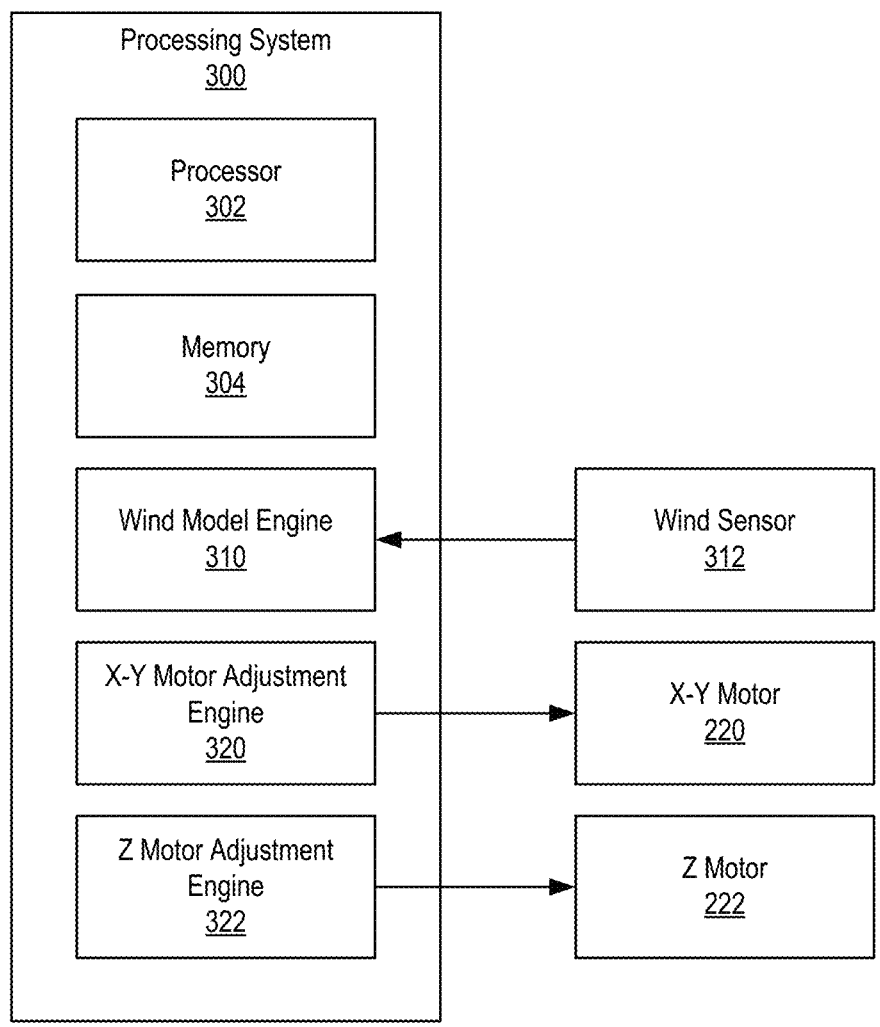
FIG. 3 depicts a block diagram of a processing system for controlling the precipitation collection device of FIG. 2 according to embodiments of the present invention.

The x-y motor 220 and the z motor 222 of the snow collection device 200 can be controlled by a processing system, such as the processing system 300 of FIG. 3, to orient the open end 104 of the collection vessel 102 into the wind direct 108. This ensures that the open end 104 maintains the same surface area with respect to the wind direction 108. That is, the snow collection device 200 is enabled to maintain a constant area of the open end 104 by adjusting the angles (e.g., Θ and δ) between the wind direction 108 and the collection vessel 102.

FIG. 3 depicts a block diagram of a processing system 300 for controlling the precipitation collection device 200 of FIG. 2 according to embodiments of the present invention. The processing system 300 includes a processor 302, a memory 304, a wind model engine 310, an x-y motor adjustment engine 320, and a z motor adjustment engine 322. The wind model engine 310 can be communicatively coupled to a wind sensor 310 to receive wind data from the wind sensor 310. The x-y motor adjustments engine can be communicatively coupled to the x-y motor 220 to send commands to adjust the x-y motor 220. The z motor adjustment engine 322 can be communicatively coupled to the z motor 222 to send commands to adjust the z motor 222. To ensure that the open end 104 of the collection vessel 102 maintains the same surface area with respect to the wind direction 108, the processing system uses wind measurements to adjust the orientation of the collection vessel 102.

The wind model engine 310 generates a wind model using wind data. The wind data is collected, for example, by the wind sensor 312. The wind sensor 312 is a device used for measuring the speed and direction of the wind. The wind sensor 312 can be any suitable anemometer, such as a cup anemometer, a vane anemometer, a hot-wire anemometer, a laser Doppler anemometer, an ultrasonic anemometer, acoustic resonance anemometer, a ping-pong ball anemometer, a late anemometer, a tube anemometer, and the like. The wind sensor 312 collects wind data and transmits it to the wind model engine 310.

Once the wind model engine 310 receives the wind data from the wind sensor 312, the wind model engine 310 generates a wind model, which can be a three-dimensional (3D) wind model. The wind model can include a speed of the wind and a direction of the wind at a given time. According to embodiments of the present invention, the wind model includes a mean wind direction and/or a mean wind speed over an interval of time (e.g., 3 seconds, 5 seconds, 30 seconds, 60 seconds, 180 seconds, etc.).

In an embodiment of the present invention, the wind model engine 310 receives a wind model from another processing system (not shown). For example, the other processing system can be responsible for collecting wind data using the wind sensor 312 or another wind sensor (not shown) and generating the wind model using the wind data. The other processing system can then transfer the wind model to the wind model engine 310 of the processing system 300.

The x-y motor adjustment engine 320 and the z motor adjustment engine 322 use the wind model to send commands to the x-y motor 220 and the z motor 222 respectively to adjust the motors 220, 222 based at least in part on the wind model. By adjusting the motors 220, 222, the collection vessel 102 can be oriented into the wind such that the open end 104 of the collection vessel 102 is aligned perpendicular to the direction of the wind (e.g. the wind direction 108).

Initially, the x-y motor adjustment engine 320 orients the collection vessel 102 with respect to an x-y plane by adjusting the x-y motor 220 based at least in part on the wind model. This adjustment of the x-y motor 220 orients (e.g., rotates) the arm 212 of FIG. 2 by rotating the arm 212 with respect to the base 210. Next, the z motor adjustment engine 322 orients the collection vessel 102 with respect to a z axis by adjusting the second motor based at least in part on the wind model. This adjustment of the z motor 222 orients (e.g., tilts) the bracket 214 by tilting the bracket 214 with respect to the arm 212. Once the x-y motor 220 is adjusted and the z motor 220 is adjusted, the open end 104 of the collection vessel 102 is oriented perpendicularly to the wind direction 108.

As the wind direction changes, the wind model engine 310 can update the wind model. Based at least in part on the change in wind direction and corresponding updated wind model, the x-y motor adjustment engine 320 and the z motor adjustment engine 322 can adjust the x-y motor 220 and the z motor 222 accordingly to re-orient the collection vessel 102. In this way, the processing system 300 is enabled to maintain a constant area of the open end 104 of the collection vessel 102 by adjusting the angles (e.g., Θ and δ) between the wind direction 108 and the collection vessel 102. According to embodiments of the present invention, the adjustments to the x-y motor 220 and the z motor 222 can occur in real-time (e.g., as the wind direction changes) or at certain intervals (e.g., every 30 seconds based at least in part on the mean wind direction for the interval). The interval can be predefined and can be adjusted.

The various components, modules, engines, etc. described regarding FIG. 3 can be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein can be a combination of hardware and programming. The programming can be processor executable instructions stored on a tangible memory, and the hardware can include the processor 302 for executing those instructions. Thus a system memory (e.g., the memory 304) can store program instructions that when executed by the processor 302 implement the engines described herein. Other engines can also be utilized to include other features and functionality described in other examples herein.

Alternatively or additionally, the processing system 100 can include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

Figure 4:
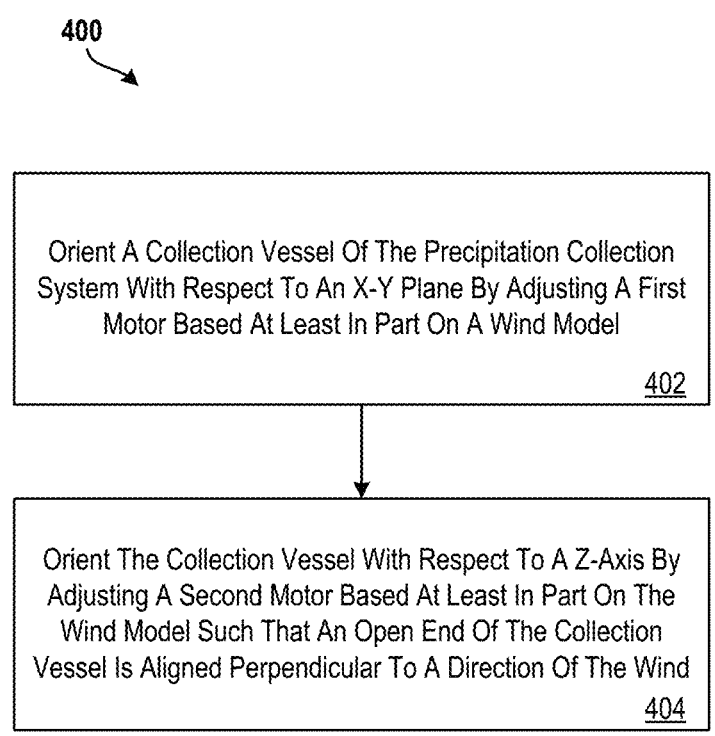
FIG. 4 depicts a flow diagram of a method for controlling the collection vessel of FIG. 1 and/or the collection device of FIG. 2 according to embodiments of the present invention.

FIG. 4 depicts a flow diagram of a method 400 for controlling the collection vessel of FIG. 1 and/or the collection device of FIG. 2 according to embodiments of the present invention. The method 400 can be implemented by any suitable processing system, such as the processing system 300, the processing system 900 of FIG. 9, and the like.

At block 402, the x-y motor adjustment engine 320 orients the collection vessel 120 with respect to an x-y plane by adjusting the x-y motor 220 based at least in part on a wind model. At block 404, the z motor adjustment engine 320 orients the collection vessel 120 with respect to a z-axis by adjusting the z motor 222 based at least in part on the wind model. This orients the open end 104 of the collection vessel 102 to be aligned perpendicularly to the wind direction 108.

In embodiments, the method 400 can also include re-orienting the collection vessel based at least in part on a change in the wind model. For example, the x-y motor adjustment engine 320 can re-orient the collection vessel 102 with respect to the x-y plane by adjusting the x-y motor 220 based at least in part on a change in the wind model. The z motor adjustment engine 322 can then re-orient the collection vessel 102 with respect to the z-axis by adjusting the z motor 222 based at least in part on the change in the wind model. The wind model can include a mean wind direction, and the re-orienting can occur based at least in part on a change in the mean wind direction.

In additional embodiments, the method 400 can include collecting wind data using a wind sensor 312. The wind model engine 310 then generates the wind model using the wind data collected using the wind sensor 312. In another embodiment, the wind model can be received by the wind model engine 310 from another processing system (not shown) that generates the wind model.

Additional processes also can be included, and it should be understood that the processes depicted in FIG. 4 represent illustrations, and that other processes can be added or existing processes can be removed, modified, or rearranged without departing from the scope and spirit of the present invention.

Figure 5:
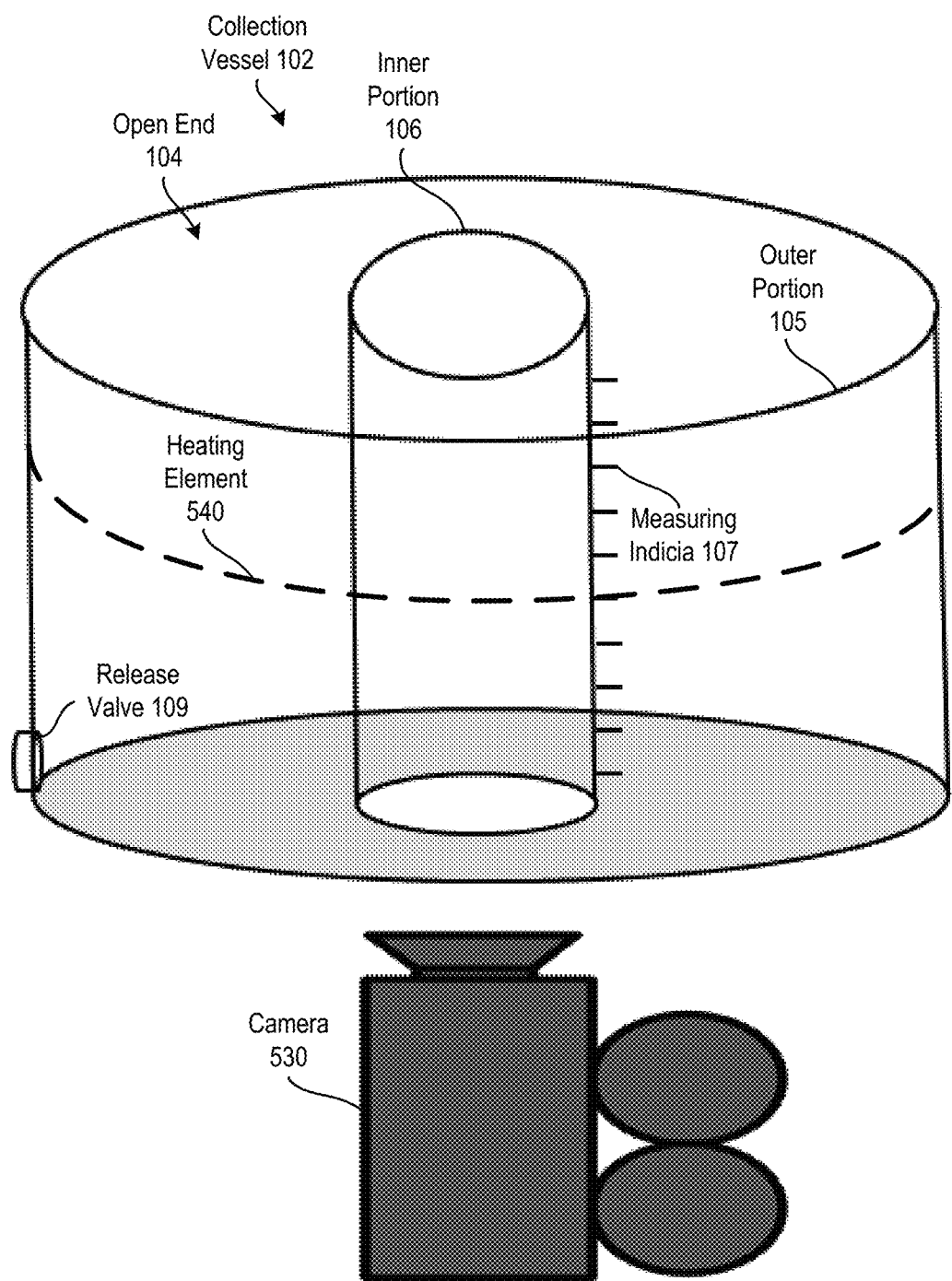
FIG. 5 depicts a block diagram of a collection vessel used to measure precipitation accumulation according to embodiments of the present invention.

FIG. 5 depicts a block diagram of a collection vessel 102 used to measure precipitation accumulation according to embodiments of the present invention. In the embodiment of FIG. 5, the collection vessel 102 includes an inner portion and at outer portion 105 forming a double cylindrical device. Precipitation accumulates between the outer portion 105 and the inner portion 106 through the open end 104. The inner portion 106 does not have an open end, thereby preventing precipitation accumulation within the inner portion.

The inner portion 106 is used for measurement of the accumulated precipitation using the measuring indicia 107 on the inner portion. For example, a camera 530 located at an end opposite the open end 104 captures images of the inner portion 106. The images captured by the camera 530 can be used by a user and/or an automated system to precipitation accumulation by comparing the level of accumulated precipitation between the outer portion 105 and the inner portion 106 to the measuring indicia 107.

The collection vessel 102 can also include a release valve 109 to automatically or manually release the accumulated precipitation. This can be useful when measuring precipitation accumulation over a period of time so that the precipitation can be released at the end of the period of time to measure precipitation accumulation over a new period of time.

In additional embodiments, the collection vessel can include one or more heating elements 540 to melt snow or other frozen precipitation. This enables a snow equivalent water measurement to be made (e.g., a measurement of the equivalent water associated with a certain volume of snow). For example, heating element 540 can be wrapped around the outer portion 105. In an embodiment, the heating element can be a flexible band that has a metal wire integrated therein that heats up when a current is applied. The heating element warms up the collection vessel 102 to melt the snow. Both the volume of snow and the volume of equivalent water can be determined in this way. Determining the volume of equivalent water can be useful for storm water management so that anticipated water amounts resulting from snow melting can be anticipated.

The collection vessel 102 can be used to measure precipitation (e.g., snow) in several different ways. For example, the accumulation rate (e.g., the amount of precipitation per minute) can be determined. The total amount of precipitation (e.g. the total amount of snow accumulated within a 24 hour period) can also be determined. In embodiments in which the collection vessel 102 includes a heating element, the water equivalent of snow can also be determined by melting the snow and measuring the amount of water remaining. An evaporation rate of the precipitation can also be determined. Cloud movement can also be inferred by detecting light and temporal shadow patterns on the collection vessel 102.

In another embodiment (not shown), the collection vessel 102 includes only the outer portion 105 without the inner portion 106. In this embodiment, the measuring indicia 107 are on the outer portion 105, and the camera 530 is positioned adjacent to the outer portion 105 of the collection vessel 102 to measure the precipitation accumulation.

Figure 6:
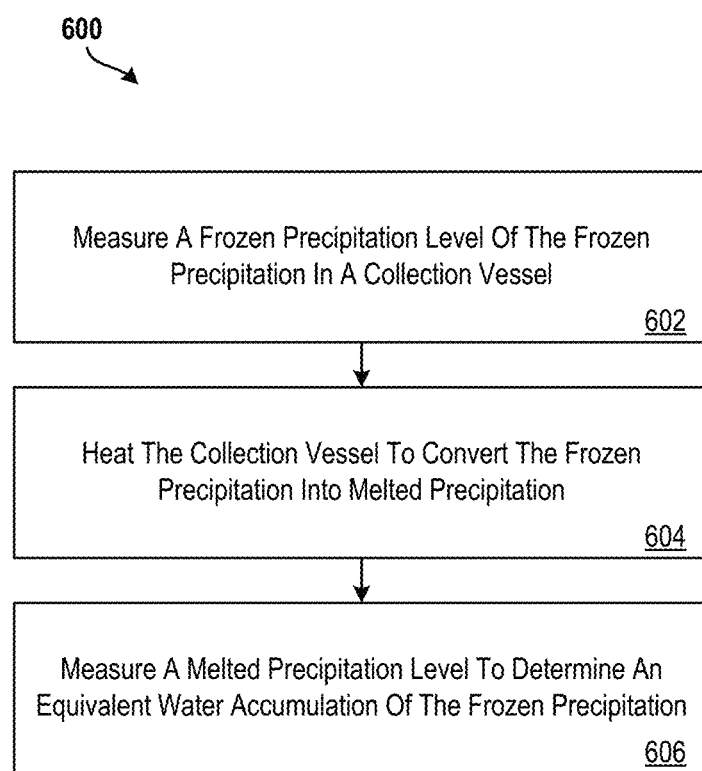
FIG. 6 depicts a flow diagram of a method for controlling a collection vessel according to embodiments of the present invention.

FIG. 6 depicts a flow diagram of a method 600 for controlling a collection vessel according to embodiments of the present invention. The method 600 can be implemented by any suitable processing system, such as the processing system 300, the processing system 900 of FIG. 9, and the like.

At block 602, the camera 540 measures a frozen precipitation level of the frozen precipitation in the collection vessel 102. At block 604, the heating element 540 applies heat to the collection vessel 102 to convert (i.e., melt) the frozen precipitation into melted precipitation. At block 606, the camera 540 again measures a melted precipitation level to determine an equivalent water accumulation of the frozen precipitation.

According to embodiments of the present invention, the method 600 can include actuating a release valve on the collection vessel to emulate the melted precipitation. The release valve can be actuated when the melted precipitation level exceeds a threshold (e.g., 1 inch, 3 inches, etc.), periodically (e.g., every 10 minutes, every hour, etc.), or manually.

Additional processes also can be included, and it should be understood that the processes depicted in FIG. 6 represent illustrations, and that other processes can be added or existing processes can be removed, modified, or rearranged without departing from the scope and spirit of the present invention.

Figure 7:
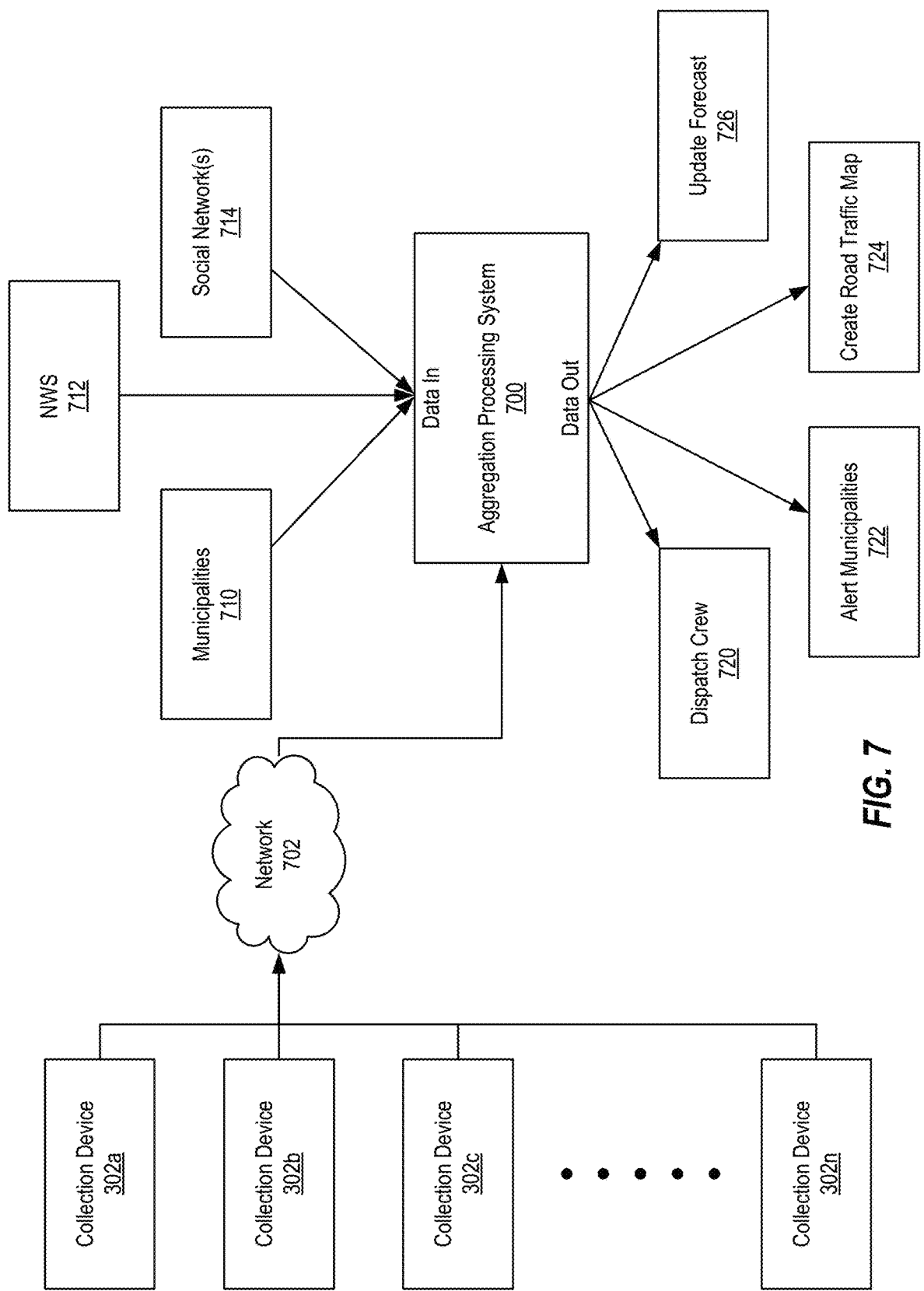
FIG. 7 depicts a block diagram of a system for aggregating precipitation accumulation data according to embodiments of the present invention.

FIG. 7 depicts a block diagram of an aggregation processing system 700 for aggregating precipitation accumulation data according to embodiments of the present invention. The system 700 includes a plurality of collection devices 302a, 302b, 302c, . . . 302n (collectively referred to as "collection devices 302"). The collection devices are configured to collect and measure precipitation to generate precipitation accumulation data according to embodiments of the present disclosure. The collection devices 302 transmit the precipitation accumulation data to the aggregation processing system 700 via a network 702.

The network 702 can include the Internet, a local area network, a wide area network, a wireless network, or any other suitable network and combinations thereof. The network 702 can include copper transmission cables, optical transmission fibers, wireless transmission, routers, firewalls, switches, gateway computers, edge servers, and other suitable devices.

The aggregation processing system 700 receives data (i.e., "data in") from various sources, such as the collection devices 302, municipalities 710 (including agencies within municipalities), the National Weather Service (NWS) 712, social networks 714, and the like. The received data can include weather forecasts, information about the position of the collection devices (e.g., GPS coordinates, topology, vegetation, buildings, infrastructure, etc.), images and status updates from social media (e.g., posts showing precipitation near the collection devices), and the like. In an embodiment, the aggregation processing system 700 receives GPS coordinates from the collection devices 302 along with snow accumulation data.

The aggregation processing system 700 aggregates the snow accumulation data received from the collection devices 302 by assembling the various measurements of precipitation measured at each of the collection devices. The aggregation processing system 700 then interpolates the snow accumulation data between physical locations of the collection device 302 taking into account topography, vegetation, buildings, infrastructure, etc. near the collection devices 302.

The aggregation processing system 700 integrates three-dimensional terrain models to assess how building height, wind direction, etc. can affect snow accumulations. The processing system 700 can acquire or receive a snow level forecast (e.g., from the National Weather Service 712 or other weather forecasting entity) and make the appropriate corrections to the forecasted values based at least in part on measurements.

In some embodiments of the present invention, the aggregation processing system 700 uses data from the social networks 714 to validate measurements. For example, images received from the social networks 714 can provide the first indication of the snow level in a particular location. The aggregation processing system 700 can also create a list of the severity of accumulated snow overlapped with population density, integrate a road/traffic map (i.e., create road traffic map 724) to clear roads snow accumulation is most extreme, issue a warning to a city, local, or federal agency (i.e., alert municipalities 722) based at least in part on the combined forecast and local measurement, dispatch a snow removal crew to a particular area based at least in part on the measurements (i.e., dispatch crew 720), update forecasts (i.e., update forecast 726), and the like.

Figure 8:
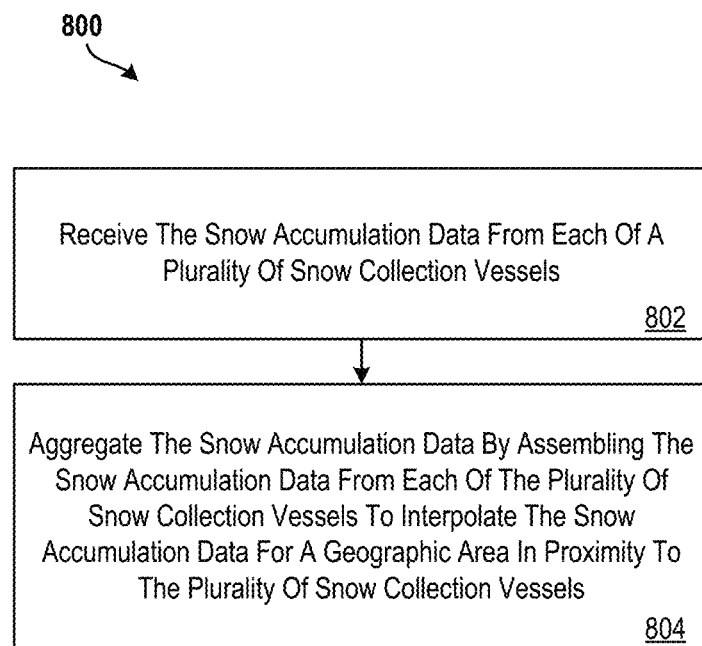
FIG. 8 depicts a flow diagram of a method for aggregating precipitation accumulation data according to embodiments of the present invention.

FIG. 8 depicts a flow diagram of a method 800 for aggregating precipitation accumulation data according to embodiments of the present invention. The method 800 can be implemented by any suitable processing system, such as the processing system 300, the processing system 900 of FIG. 9, and the like.

At block 802, the aggregation processing system 700 receiving the snow accumulation data from each of a plurality of collection vessels 302. At block 804, the aggregation processing system 700 aggregates the snow accumulation data by assembling the snow accumulation data from each of the plurality of collection vessels 302 to interpolate the snow accumulation data for a geographic area in proximity to the plurality of collection vessels. The snow aggregation method can also take into account the building height and wind orientation to model how snow may have accumulated on two sides of the road and on which side the wind may have accumulated a larger amount. Information about parking regulation for that side of the street can be considered to assess whether snow can be removed or whether cars are blocking the snow removal.

Additional processes also can be included, and it should be understood that the processes depicted in FIG. 8 represent illustrations, and that other processes can be added or existing processes can be removed, modified, or rearranged without departing from the scope and spirit of the present invention.

The snow accumulated across a geographical area can be used to prioritize locations with highest snow accumulations that would trigger snow removal crew dispatch in that area. The snow accumulation data can be also used to optimize the route that snow removal equipment and crew to be followed such that removed snow enable car movement on the streets. The order of the street cleaning can maximize the number of people that can remove their car from the streets to enable total snow removal.

Figure 9:
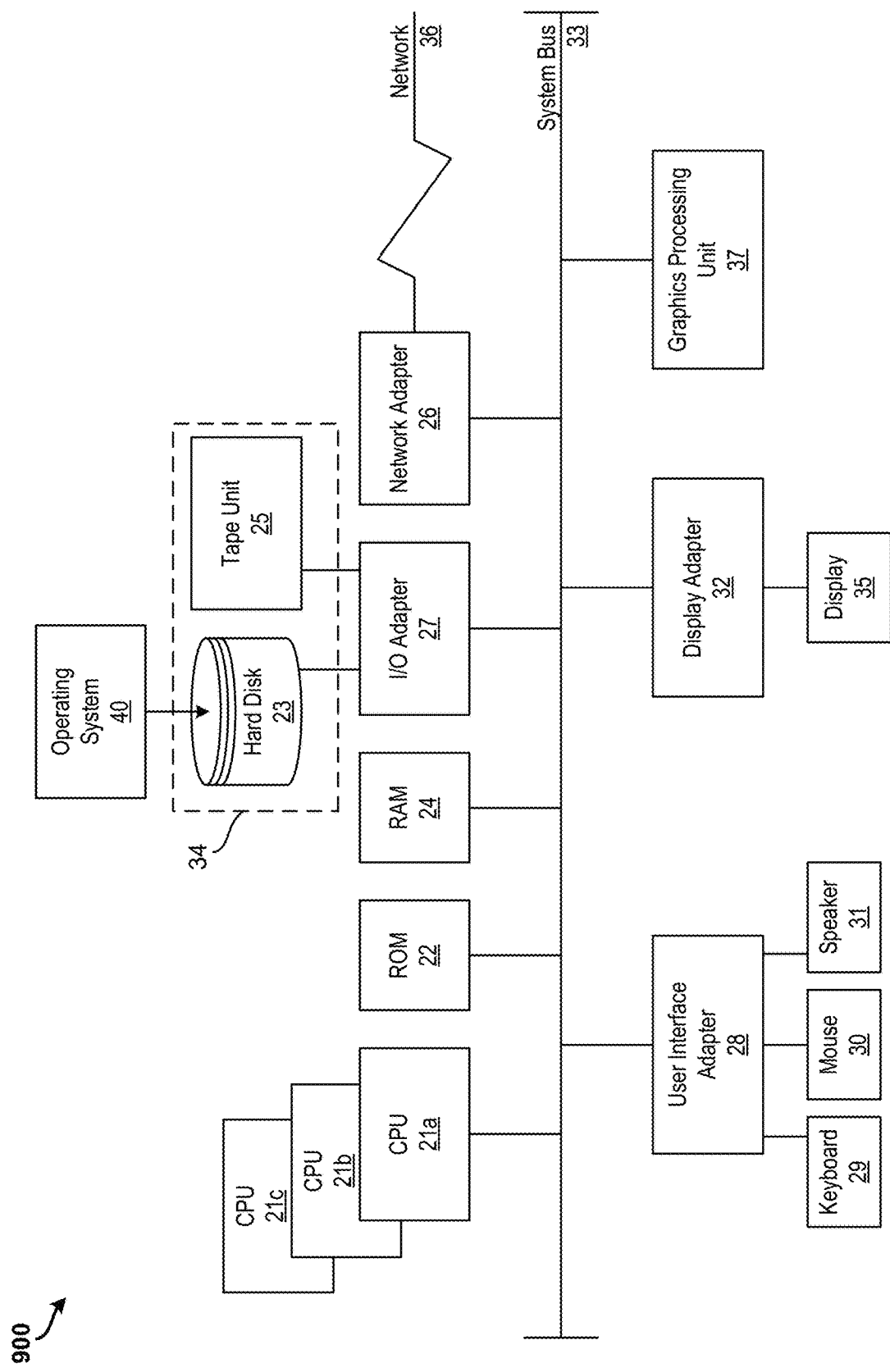
FIG. 9 depicts a block diagram of a processing system for implementing aspects of the present invention.

It is understood that the present invention is capable of being implemented in conjunction with any other type of computing environment now known or later developed. For example, FIG. 9 depicts a block diagram of a processing system 20 for implementing aspects of the present invention. In examples, processing system 20 has one or more central processing units (processors) 21a, 21b, 21c, etc. (collectively or generically referred to as processor(s) 21 and/or as processing device(s)). In aspects of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 20.

Further illustrated are an input/output (I/O) adapter 27 and a network adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 can be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which can include a graphics adapter to improve the performance of graphics intensive applications and a video controller. In one aspect of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

In some aspects of the present invention, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present invention, a portion of system memory (e.g., RAM 24) and mass storage 34 collectively store an operating system such as the AIX® operating system from IBM Corporation to coordinate the functions of the various components shown in processing system 20.

In other examples, the present invention can be implemented on cloud computing. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
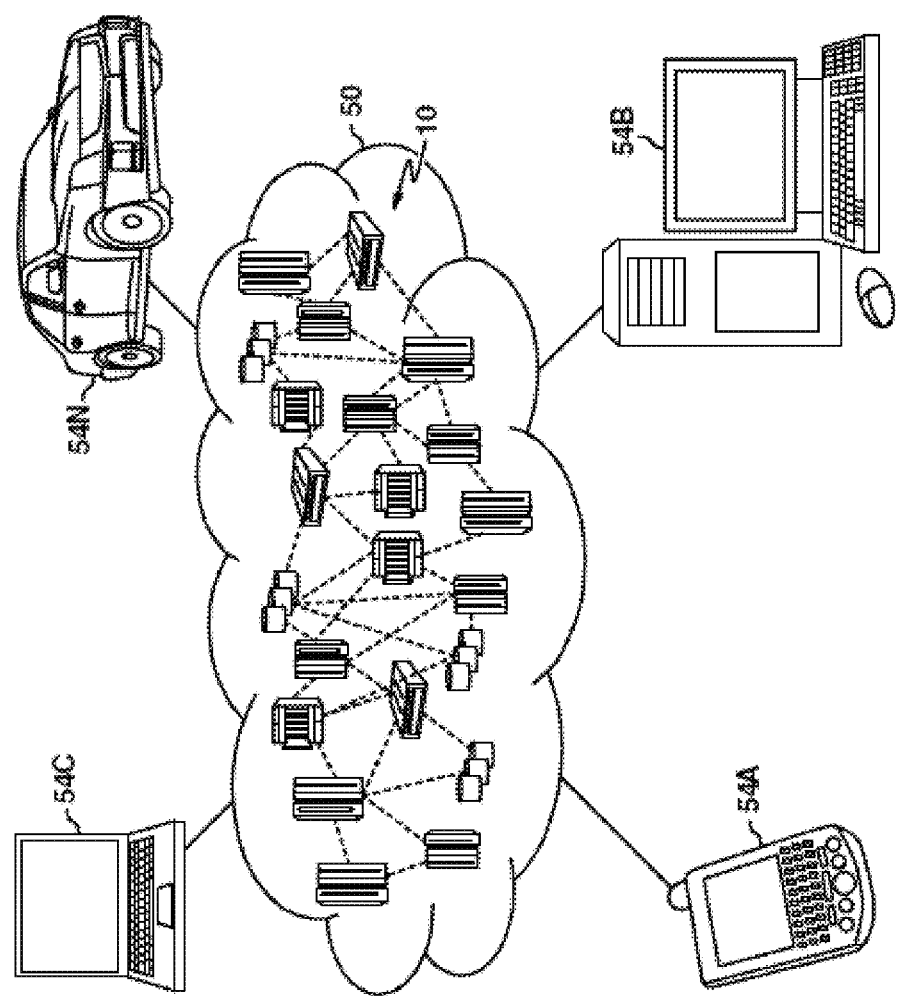
FIG. 10 depicts a cloud computing environment according to embodiments of the present invention.

Referring now to FIG. 10, illustrative cloud computing environment 50 is illustrated. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
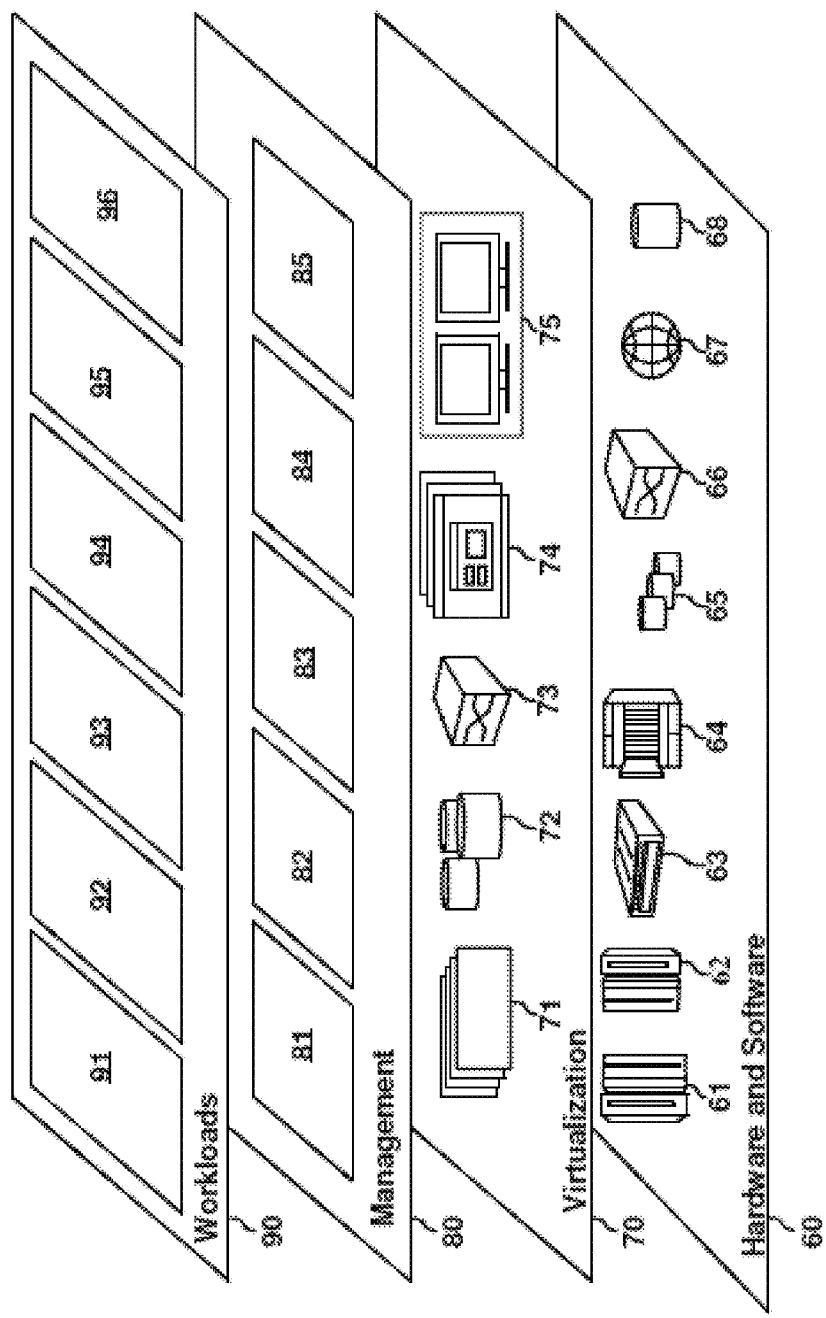
FIG. 11 depicts abstraction model layers according to embodiments of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As illustrated, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and aggregating snow accumulation data 96.

The present techniques can be implemented as a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some examples, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to aspects of the present invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present invention. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present invention have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A computer-implemented method comprising:
    collecting snow in a plurality of collection vessels by orienting an open end of each of the plurality of collection vessels perpendicularly to a direction of the wind based at least in part on a wind model;
    measuring a snow level of the snow in each of the plurality of collection vessels to generate snow level data for each of the plurality of collection vessels; and
    aggregating the snow level data for each of the plurality of snow collection by assembling the snow accumulation data from each of the plurality of collection vessels.

2. The computer-implemented method of claim 1, further comprising re-orienting the open end of at least one of the plurality of collection vessels based at least in part on a change in the wind model.

3. The computer-implemented method of claim 1, wherein orienting the open end of one or more of the plurality of collection vessels further comprises:
    orienting, by a processing device, the one or more of the plurality collection vessels with respect to an x-y plane by adjusting a first motor based at least in part on the wind model; and
    orienting, by the processing device, the one or more of the plurality of collection vessels with respect to a z-axis by adjusting a second motor based at least in part on the wind model such that the open end of the one or more of the plurality of collection vessels is aligned perpendicular to the direction of the wind.

4. The computer-implemented method of claim 3 further comprising:
    re-orienting, by the processing device, the one or more of the plurality of collection vessels with respect to the x-y plane by adjusting the first motor based at least in part on a change in the wind model; and
    re-orienting, by the processing device, the one or more of the plurality of collection vessels with respect to the z-axis by adjusting the second motor based at least in part on the change in the wind model.

5. The computer-implemented method of claim 1, wherein the wind model is a three-dimensional wind model.

6. The computer-implemented method of claim 1, further comprising:
    collecting wind data using a wind sensor; and
    generating the wind model based at least in part on the wind data,
    wherein the wind model comprises a mean wind direction.

7. The computer-implemented method of claim 1, wherein the measuring the snow level of the snow in each of the plurality of collection vessels to generate the snow level data for each of the plurality of collection vessels comprises:
    measuring a snow level of the snow in each of the plurality of collection vessels;
    heating each of the plurality of collection vessels to convert the snow into melted precipitation; and
    measuring a melted precipitation level to determine an equivalent water accumulation of the snow.

8. The computer-implemented method of claim 7, wherein the measuring the snow level of the snow in each of the plurality of collection vessels to generate the snow level data for each of the plurality of collection vessels further comprises actuating a release valve of one or more of the plurality of collection vessels to eliminate the melted precipitation.

9. The computer-implemented method of claim 8, wherein the release valve is activated responsive to the melted precipitation level exceeding a threshold.

10. The computer-implemented method of claim 8, wherein the release valve is activated periodically.

11. A system comprising:
    a memory comprising computer readable instructions; and
    a processing device for executing the computer readable instructions, the computer readable instructions controlling the processing device to perform operations comprising:
        collecting snow in a plurality of collection vessels by orienting an open end of each of the plurality of collection vessels perpendicularly to a direction of the wind based at least in part on a wind model;
        measuring a snow level of the snow in each of the plurality of collection vessels to generate snow level data for each of the plurality of collection vessels; and
        aggregating the snow level data for each of the plurality of snow collection by assembling the snow accumulation data from each of the plurality of collection vessels.

12. The system of claim 11, wherein the operations further comprise re-orienting the open end of at least one of the plurality of collection vessels based at least in part on a change in the wind model.

13. The system of claim 11, wherein orienting the open end of one or more of the plurality of collection vessels further comprises:
    orienting, by a processing device, the one or more of the plurality collection vessels with respect to an x-y plane by adjusting a first motor based at least in part on the wind model; and
    orienting, by the processing device, the one or more of the plurality of collection vessels with respect to a z-axis by adjusting a second motor based at least in part on the wind model such that the open end of the one or more of the plurality of collection vessels is aligned perpendicular to the direction of the wind.

14. The system of claim 13, wherein the operations further comprise:
    re-orienting, by the processing device, the one or more of the plurality of collection vessels with respect to the x-y plane by adjusting the first motor based at least in part on a change in the wind model; and
    re-orienting, by the processing device, the one or more of the plurality of collection vessels with respect to the z-axis by adjusting the second motor based at least in part on the change in the wind model.

15. The system of claim 11, wherein the wind model is a three-dimensional wind model.

16. The system of claim 11, wherein the operations further comprise:
collecting wind data using a wind sensor; and
generating the wind model based at least in part on the wind data,
wherein the wind model comprises a mean wind direction.

17. The system of claim 11, wherein the measuring the snow level of the snow in each of the plurality of collection vessels to generate the snow level data for each of the plurality of collection vessels comprises:
measuring a snow level of the snow in each of the plurality of collection vessels;
heating each of the plurality of collection vessels to convert the snow into melted precipitation; and
measuring a melted precipitation level to determine an equivalent water accumulation of the snow.

18. The system of claim 17, wherein the measuring the snow level of the snow in each of the plurality of collection vessels to generate the snow level data for each of the plurality of collection vessels further comprises actuating a release valve of one or more of the plurality of collection vessels to eliminate the melted precipitation.

19. The system of claim 18, wherein the release valve is activated responsive to the melted precipitation level exceeding a threshold, and wherein the release valve is activated periodically.

20. A computer program product comprising a computer readable storage medium having program instructions embodied therewith, the program instructions executable by a processor to cause the processor to perform operations comprising:
collecting snow in a plurality of collection vessels by orienting an open end of each of the plurality of collection vessels perpendicularly to a direction of the wind based at least in part on a wind model;
measuring a snow level of the snow in each of the plurality of collection vessels to generate snow level data for each of the plurality of collection vessels; and
aggregating the snow level data for each of the plurality of snow collection by assembling the snow accumulation data from each of the plurality of collection vessels.

* * * * *